United States Patent
Budde et al.

(10) Patent No.: US 9,997,206 B2
(45) Date of Patent: *Jun. 12, 2018

(54) DISC DRIVE ACTUATOR ASSEMBLY WITH BEARING COOLING

(71) Applicant: Seagate Technology LLC, Cupertino, CA (US)

(72) Inventors: Richard August Budde, Plymouth, MN (US); Dipeshkumar J. Purani, Shakopee, MN (US)

(73) Assignee: Seagate Technology LLC, Cupertino, CA (US)

(*) Notice: Subject to any disclaimer, the term of this patent is extended or adjusted under 35 U.S.C. 154(b) by 0 days. days.

This patent is subject to a terminal disclaimer.

(21) Appl. No.: 15/687,942

(22) Filed: Aug. 28, 2017

(65) Prior Publication Data

US 2017/0358326 A1  Dec. 14, 2017

Related U.S. Application Data

(62) Division of application No. 14/804,858, filed on Jul. 21, 2015, now Pat. No. 9,747,955.

(51) Int. Cl.
| | | |
|---|---|---|
| *G11B 33/14* | (2006.01) | |
| *G11B 5/48* | (2006.01) | |
| *G11B 25/04* | (2006.01) | |

(52) U.S. Cl.
CPC ........ *G11B 33/1406* (2013.01); *G11B 5/4833* (2013.01); *G11B 25/043* (2013.01); *G11B 33/1426* (2013.01); *G11B 33/1473* (2013.01)

(58) Field of Classification Search
None
See application file for complete search history.

(56) References Cited

U.S. PATENT DOCUMENTS

| | | | |
|---|---|---|---|
| 5,146,450 A | 9/1992 | Brooks et al. | |
| 5,214,552 A | 5/1993 | Haga | |
| 5,827,424 A * | 10/1998 | Gillis | B01D 5/0042 |
| | | | 210/180 |
| 6,078,477 A | 6/2000 | Adams et al. | |
| 6,144,530 A | 11/2000 | Shiraishi et al. | |
| 6,181,530 B1 | 1/2001 | Ratliff et al. | |

(Continued)

FOREIGN PATENT DOCUMENTS

| | | |
|---|---|---|
| JP | 62103878 A | 5/1987 |
| JP | 62137780 A | 6/1987 |

(Continued)

OTHER PUBLICATIONS

English-machine translation of KR 2006-0110538A to Lee, published on Oct. 25, 2006.

*Primary Examiner* — William J Klimowics
(74) *Attorney, Agent, or Firm* — Crawford Maunu PLLC

(57) ABSTRACT

Various aspects of the present disclosure are directed toward a disc drive actuator assembly including an e-block, a plurality of bearings, and one or more heat transfer components. The heat transfer component(s) operates to conductively draw heat from the plurality of bearings through the e-block, and convectively dissipate the heat into an atmosphere in contact therewith. The heat transfer component(s) mitigates temperature rise of the bearings during operation of a disc drive, thereby mitigating bearing lubricant outgassing from within the bearings.

19 Claims, 5 Drawing Sheets

(56) References Cited

U.S. PATENT DOCUMENTS

| | | | |
|---|---|---|---|
| 6,208,484 B1 | 3/2001 | Voights | |
| 6,452,740 B1* | 9/2002 | Ghoshal | B82Y 10/00 360/125.71 |
| 6,480,364 B1 | 11/2002 | Thanomsat et al. | |
| 6,643,101 B1 | 11/2003 | Adams et al. | |
| 6,801,404 B1 | 10/2004 | Oveyssi | |
| 6,847,506 B1 | 1/2005 | Lin et al. | |
| 6,940,698 B2 | 9/2005 | Lin et al. | |
| 7,079,358 B2 | 7/2006 | Hirasaka et al. | |
| 7,835,110 B2* | 11/2010 | Johnston | B82Y 10/00 360/97.12 |
| 8,355,298 B2 | 1/2013 | Sasaki et al. | |
| 8,730,607 B1* | 5/2014 | Garzon | G11B 5/6076 360/55 |
| 8,922,949 B1* | 12/2014 | Koui | G11B 5/235 360/125.3 |
| 2002/0154449 A1 | 10/2002 | Raphael et al. | |
| 2003/0202274 A1* | 10/2003 | Onda | G11B 19/28 360/69 |
| 2004/0114278 A1 | 6/2004 | Hirasaka et al. | |
| 2004/0174639 A1 | 9/2004 | Asano et al. | |
| 2007/0153414 A1* | 7/2007 | Sullivan | G06F 1/20 360/99.18 |
| 2007/0283375 A1* | 12/2007 | Miyake | G11B 17/028 720/695 |
| 2013/0287328 A1* | 10/2013 | Frank | F16C 33/58 384/476 |

FOREIGN PATENT DOCUMENTS

| | | | |
|---|---|---|---|
| JP | 02227883 A | | 9/1990 |
| JP | 2001057014 A | * | 2/2001 |
| JP | 2003297029 A | * | 10/2003 |
| JP | 2006135073 A | | 5/2006 |

* cited by examiner

SECTION A-A

SECTION A-A

DISC DRIVE ACTUATOR ASSEMBLY WITH BEARING COOLING

BACKGROUND

Disc drives are used for data storage in modern electronic products ranging from audio players to computer systems and networks. A disc drive typically includes a mechanical portion, or head disc assembly (HDA), and electronics in the form of a printed circuit board assembly (PCBA), mounted to an outer surface of the HDA. The PCBA controls HDA functions and provides an interface between the disc drive and its host. An HDA includes moving parts such as one or more storage mediums affixed to a spindle motor assembly for rotation at a constant speed, an actuator assembly supporting an array of transducers (e.g., magnetoresistive or other) that traverse generally concentric data tracks radially spaced across surfaces of the storage mediums, and a voice coil motor (VCM) providing rotational motion to the actuator assembly. In operation, the spindle motor rapidly rotates the storage mediums and the VCM positions the transducers above the data tracks to access (read and/or write) the data stored on the storage mediums.

SUMMARY

Various example embodiments are directed to apparatuses and/or methods that mitigate the escape of vapor and/or evaporated lubricant from a bearing cartridge assembly by reducing the operating temperature of such bearing cartridge assemblies. One or more of these embodiments may be particularly applicable, for example, to disc drives which include mechanical components particularly sensitive to foreign substances such as condensed lubricant. For example, condensed lubricant may accumulate on a head or data surface of storage mediums causing read/write errors, or otherwise affecting the performance of the disc drive. Accordingly, aspects of the present disclosure mitigate or prevent the outgassing of such lubricant from the bearing cartridge assembly by controlling the bearing cartridge assembly temperature to limit vaporization and outgassing of the lubricant. In conjunction with one or more such embodiments, it has been discovered that various embodiments of the present disclosure can significantly reduce vapor and/or evaporated lubricant escaping from the bearing cartridge assembly, thereby greatly extending the functional life of a disc drive.

According to various example embodiments, aspects of the present disclosure are directed toward a disc drive actuator assembly including an e-block, a plurality of bearings, and one or more heat transfer components. The e-block facilitates read and write access of a plurality of storage mediums by positioning a transducer relative to the plurality of storage mediums. The plurality of bearings located within the e-block facilitate rotation of the e-block around a pivot shaft of a disc drive base deck ("rotationally coupled"). The one or more heat transfer components are thermally coupled to the e-block (e.g., coupled to an interior or exterior surface), and mitigate temperature rise of the plurality of bearings during operation of a disc drive by conductively drawing heat from the plurality of bearings through the e-block. Once the heat is drawn to the one or more heat transfer components, the heat is convectively dissipated from surfaces thereof into an atmosphere in contact therewith. In yet more specific embodiments, the one or more heat transfer components mitigate outgassing of bearing lubricant from within the plurality of bearings by limiting increases in temperature of the bearing during operation of the disc drive, via the heat dissipation.

Certain embodiments of the present disclosure are directed toward a method for mitigating temperature rise of a plurality of bearings in a disc drive apparatus, and/or for providing a disc drive apparatus that mitigates temperature rise. One such method involves providing a base deck including a pivot shaft and a cavity, an e-block, a plurality of bearings, and one or more heat transfer components. The one or more heat transfer components are provided for convectively dissipating the heat from the one or more heat transfer components into an atmosphere in contact therewith. The pivot shaft and cavity of the base deck provide for the coupling of the storage mediums to the base deck. The e-block facilitates read and write access of the plurality of storage mediums by positioning one or more transducers coupled to the e-block over the plurality of storage mediums, and each of the bearings includes inner races, outer races, and a plurality of balls there between. The inner race of each bearing is coupled to the pivot shaft of the disc drive, the outer race of each bearing is coupled to the e-block, and the plurality of bearings facilitate rotation of the e-block around the pivot shaft. The one or more heat transfer components are coupled to the e-block and conductively coupled via the e-block to the plurality of bearings.

In various implementations, the method further includes operating the disc drive apparatus by causing the e-block to rotate about the pivot shaft via the plurality of bearings, and mitigating temperature rise of the plurality of bearings during operation of the disc drive apparatus. The temperature rise is mitigated by conductively transferring heat induced by rotation of the plurality of bearings through the e-block to the one or more heat transfer components, and convectively dissipating the heat from the one or more heat transfer components into an atmosphere in contact therewith.

The above discussion/summary is not intended to describe each embodiment or every implementation of the present disclosure. The figures and detailed description that follow also exemplify various embodiments.

DESCRIPTION OF THE FIGURES

Various example embodiments may be more completely understood in consideration of the following detailed description in connection with the accompanying drawings, in which.

Figure 1A:
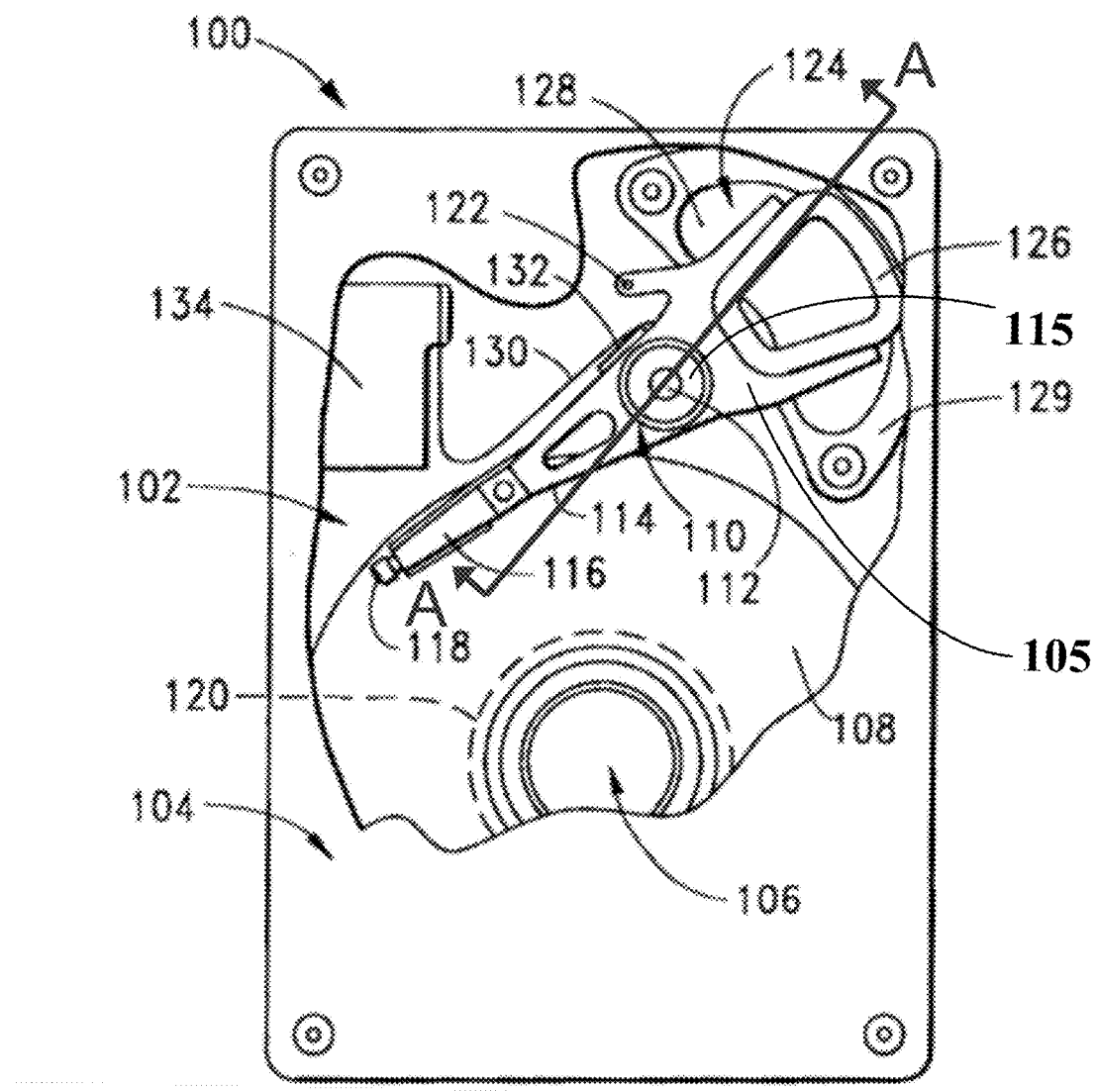
FIG. 1A is a top view of a disc drive, consistent with various aspects of the present disclosure.

While various embodiments discussed herein are amenable to modifications and alternative forms, aspects thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Various example embodiments are directed to apparatuses and/or methods that mitigate the escape of vapor and/or evaporated lubricant from a bearing cartridge assembly by maintaining or controlling the operating temperature of the bearing cartridge assembly. In various implementations, the temperature of the bearings is maintained below a target temperature at which vaporization of lubricant is mitigated or prevented. One or more of these embodiments may be particularly applicable, for example, to disc drives that include mechanical components sensitive to foreign substances such as condensed lubricant. For example, condensed lubricant may accumulate on a head or data surface of storage mediums causing read/write errors, or otherwise affecting the performance of the disc drive. Accordingly, aspects of the present disclosure mitigate or prevent the outgassing of such lubricant from the bearing cartridge assembly by maintaining the bearing cartridge assembly at a temperature that limits vaporization and outgassing of the lubricant, therein addressing the aforementioned issues. While embodiments of the present disclosure are not necessarily so limited to disc drive applications, various aspects may be appreciated through a discussion of examples using this context.

One embodiment of the present disclosure is directed toward a disc drive actuator assembly including an e-block, a plurality of bearings, and one or more heat transfer components. The e-block facilitates read and write access of a plurality of storage mediums by positioning a transducer relative to the storage mediums. The bearings are located within the e-block facilitate rotation of the e-block around a pivot shaft of a disc drive base deck. The one or more heat transfer components are thermally coupled to a surface of the e-block, and mitigate temperature rise of the bearings during operation of a disc drive by conductively drawing heat from the bearings through the e-block. Once the heat is drawn to the heat transfer components, the heat is convectively dissipated from surfaces of the heat transfer components into an atmosphere in contact therewith. In yet more specific embodiments, the heat transfer components mitigate outgassing of bearing lubricant from within the bearings by limiting increases in temperature of the bearing lubricant during operation of the disc drive via such heat dissipation. In conjunction with these and other aspects of the present disclosure, it has been discovered that the escape of vapor and/or evaporated lubricant from the bearing cartridge assembly can be significantly reduced, thereby extending the functional life of a disc drive which may otherwise be shortened by failure modes associated with the escape of such evaporated lubricant.

In more specific embodiments of the present disclosure, the disc drive actuator assembly further includes a heat transfer component (or components) and a thermoelectric cooler coupled to the e-block, such as to an interior or exterior surface thereof. The heat transfer component includes a cylindrical sleeve that encompasses bearings and conductively draws heat from the bearings to the thermoelectric cooler. The thermoelectric cooler then dissipates the heat into an atmosphere in contact therewith.

In further embodiments, the disc drive actuator assembly may also include a temperature sensor thermally coupled to the plurality of bearings, and a control circuit communicatively coupled to the temperature sensor and the thermoelectric cooler. The control circuit operates the thermoelectric cooler in response to receiving a signal from the temperature sensor indicative of a temperature of the plurality of bearings (e.g., that the temperature is above or nearing a threshold temperature). When the signal received from the temperature sensor is indicative of the temperature of the bearings being below a threshold temperature, the control circuit disables or otherwise ramps down the thermoelectric cooler to reduce energy consumption of the disc drive.

Various embodiments of the present disclosure are directed to disc drive actuator assemblies in which one or more heat transfer components include cooling elements such as thermoelectric coolers, piezoelectric pumps, a heat sink, a fan, an integrated heat spreader, other passive or active cooling elements, or combinations thereof. In many embodiments the heat transfer components include materials with high thermal conductivity rates and metals which facilitate heat transfer from the bearings to the atmosphere within the disc drive.

Many aspects of the present disclosure are directed to disc drive actuator assemblies including one or more actuator arms coupled to an e-block. In such embodiments, each actuator arm is arranged to position a transducer (during operation of the disc drive) relative to a plurality of storage mediums and access data stored thereon. In many embodiments the heat transfer components are coupled to the e-block with a fastening member. While in operation, rotation of the storage mediums causes a flow of atmospheric air/gas within the disc drive which interacts with the heat transfer components to draw heat away from the bearings. To further facilitate transfer of the heat into the atmosphere, the heat transfer components may include features extending from a surface of the e-block. Exemplary features include extrusions with a saw-tooth cross section (e.g., 242 of FIG. 2), a wavy cross section (e.g., 244 of FIG. 2), or other shape, orientation, or configuration that enhances or maximizes the overall surface area of the features to aid heat transfer into the atmosphere.

Many embodiments of the present disclosure are directed to apparatuses comprising a base deck, a plurality of storage mediums, a disc drive actuator assembly, and a heat transfer component. The base deck includes a pivot shaft fixed relative to the base deck. The disc drive actuator assembly includes a transducer, an e-block, and a plurality of bearings. The e-block facilitates read and write access of the storage mediums by positioning the transducer over a portion of the storage mediums (corresponding to desired data storage locations for access). The bearings are rotationally coupled to the pivot shaft of the base deck and the e-block, and facilitate rotation of the e-block around the pivot shaft due to the rotational coupling. The heat transfer component is coupled to the e-block, and conductively draws heat from the bearings through the e-block to the heat transfer component. The heat transfer component then dissipates the heat into an atmosphere in contact therewith. This dissipation can reduce vaporization and provide other benefits, such as by mitigating the generation of rotational torque on the e-block associated with thermal expansion of the plurality of bearings.

Various aspects of the present disclosure are directed towards different aspects of disc drive apparatuses, such as those described above, along with related methods of manufacture and use. For example, these methods include the manufacture of the entire disc drive apparatuses and/or portions thereof such as the e-block and base.

In one embodiment, a method for mitigating temperature rise of a plurality of bearings in a disc drive apparatus is as follows. A base deck is provided along with a pivot shaft and a cavity, an e-block, a plurality of bearings, and one or more heat transfer components. The pivot shaft and cavity of the base deck provide for the coupling of the storage mediums to the base deck. The e-block facilitates read and write access of the storage mediums by positioning one or more transducers coupled to the e-block over the storage mediums. Each of the bearings includes inner races, outer races, and a plurality of balls therebetween. The inner race of each bearing is coupled to a pivot shaft of the disc drive, the outer race of each bearing is coupled to the e-block, and the bearings facilitate rotation of the e-block around the pivot shaft. The heat transfer component(s) is coupled to the e-block and conductively coupled via the e-block to the bearings.

In some implementations, the disc drive apparatus is operated by causing the e-block to rotate about the pivot shaft, via the plurality of bearings. During operation, heat induced by rotation of the bearings (or otherwise present) conductively transferred through the e-block to the heat transfer component(s), where the heat is convectively dissipated into a surrounding atmosphere.

Turning now to the figures, FIG. 1A shows a disc drive 100 in accordance with one or more exemplary embodiments of the present disclosure. The disc drive 100 includes a base deck 102 to which various components of the disc drive 100 are mounted. A top cover 104 (shown in partial cutaway fashion) and the base deck 102 are coupled together to form a sealed atmospheric environment for the disc drive 100. A spindle motor (shown generally at 106)) rotates one or more storage mediums 108 at a high speed during operation of the disc drive 100. A transducer 118 accesses (writes and/or reads) information on the storage mediums 108 through the use of an actuator assembly 110 including an e-block 105. During operation, the e-block 105 and attached transducer 118 rotate about a pivot shaft 112, using a cartridge bearing assembly 115 to access data stored on tracks of the storage mediums 108. This rotation, over time, creates friction which dissipates in the cartridge bearing assembly 115 as heat. In connection with one or more embodiments, it has been recognized/discovered that increased operating temperature of the cartridge bearing assembly 115 induces vaporization of bearing lubricant therein, and eventual outgassing of the bearing lubricant into a cavity between the base deck 102 and the top cover 104. Upon coming into contact with cooler surfaces within the disc drive 100 the bearing lubricant condenses. Where the bearing lubricant condenses on sensitive components of the disc drive 100 (e.g., storage mediums 108 and/or transducers 118) this condensation can result in a failure mode of the disc drive 100. Accordingly, aspects of the present disclosure are directed to cooling the cartridge bearing assembly 115 to mitigate or prevent such bearing lubricant vaporization and subsequent outgassing into the cavity of the disc drive 100 using heat transfer components, which are shown and discussed in greater detail in reference to FIG. 1B.

The actuator assembly 110 includes a plurality of actuator arms 114 that extend towards the storage medium 108, with one or more flexures 116 extending from each of the actuator arms 114. Mounted at the distal end of each of the flexures 116 is a transducer 118 which includes a slider assembly designed to enable the transducer 118 to fly in close proximity to the corresponding surface of the associated storage medium 108. During operation of the disc drive 100, access requests for data stored on the storage mediums 108, from one or more computer systems communicatively coupled to the disc drive 100, require that the transducer 118 traverse rapidly across the storage mediums 108 between locations of access request storage locations. Throughput performance of a disc drive 100 is closely tied to the speed at which the transducer 118 traverse across the storage mediums 108. To achieve such data throughput, bearings within the cartridge bearing assembly 115 are rotated at high rates of speed and friction between components of the cartridge bearing assembly 115 dissipates as heat. In some cases, this heat causes thermal expansion of components of the cartridge bearing assembly 115 which can induce additional friction between the components of the cartridge bearing assembly 115 and dissipate additional heat into the assembly.

The radial position of the transducers 118 over the storage mediums 108 are controlled through the use of a VCM 124, which may include a coil 126 attached to the actuator assembly 110, as well as one or more permanent magnets 128 and corresponding magnetically permeable pole-pieces 129 which establish a magnetic field in which the coil 126 is immersed. The controlled application of current to the coil 126 causes magnetic interaction between the magnetic field of the VCM 124 and electromagnetic fields induced in the coil 126, so that the coil 126 moves in accordance with the well-known Lorentz relationship. As the coil 126 moves, the actuator assembly 110 pivots about the pivot shaft 112 and the transducers 118 are moved across the surfaces of the storage mediums 108. In performance-focused disc drive applications, the electrical current of the coil 126 is rapidly changed in order to maximize disc seek velocity and minimize latency between a read/write request to the disc drive and fulfillment of the request. As discussed above, this rapid movement creates friction between bearings, and inner and outer tracks of the cartridge bearing assembly 115 which dissipates as heat therein. It has been recognized/discovered that even a small increase of temperature in the cartridge bearing assembly 115 can cause a significant increase in bearing lubricant vaporization and outgassing into the cavity of the disc drive 100. As such, various embodiments are directed toward mitigating such temperature increases.

A flex assembly 130 provides electrical connection paths for the actuator assembly 110 while allowing pivotal movement thereof during operation, and while maintaining a nearly constant and low rotational torque on the actuator assembly. Such actuator assemblies suffering from rotational torque variations greater than 10% during operation of the disc drive 100 may exhibit significantly reduced seek performance. One example of rotational torque variation that can cause such reduced seek performance is thermal expansion of components of a cartridge bearing assembly 115 reducing tolerances and inducing increased friction there between. A servo controller, which controls the application of current to the coil 126 inducing movement of the actuator assembly 110 relative to the base deck 102, must compensate for this inconsistent rotational torque on the cartridge bearing assembly 115. Where the servo controller is unable to accurately compensate for the induced rotational torque on the cartridge bearing assembly 115, the seek performance and accordingly the overall data throughput of the disc drive 100 is reduced. Accordingly, various aspects are directed to mitigating temperature rise in this context, and addressing related issues.

The flex assembly 130 includes a printed circuit board 132 to which head wires may be connected and routed along the actuator arms 114 and the flexures 116 to the transducers 118. The printed circuit board 132 includes circuitry for controlling the write currents applied to the transducers 118 during a write operation and for amplifying read signals generated by the transducers 118 during a read operation. The flex assembly terminates at a flex bracket 134 for communication through the base deck 102 (e.g., to a disc drive printed circuit board mounted to the bottom side of the disc drive 100).

Figure 1B:
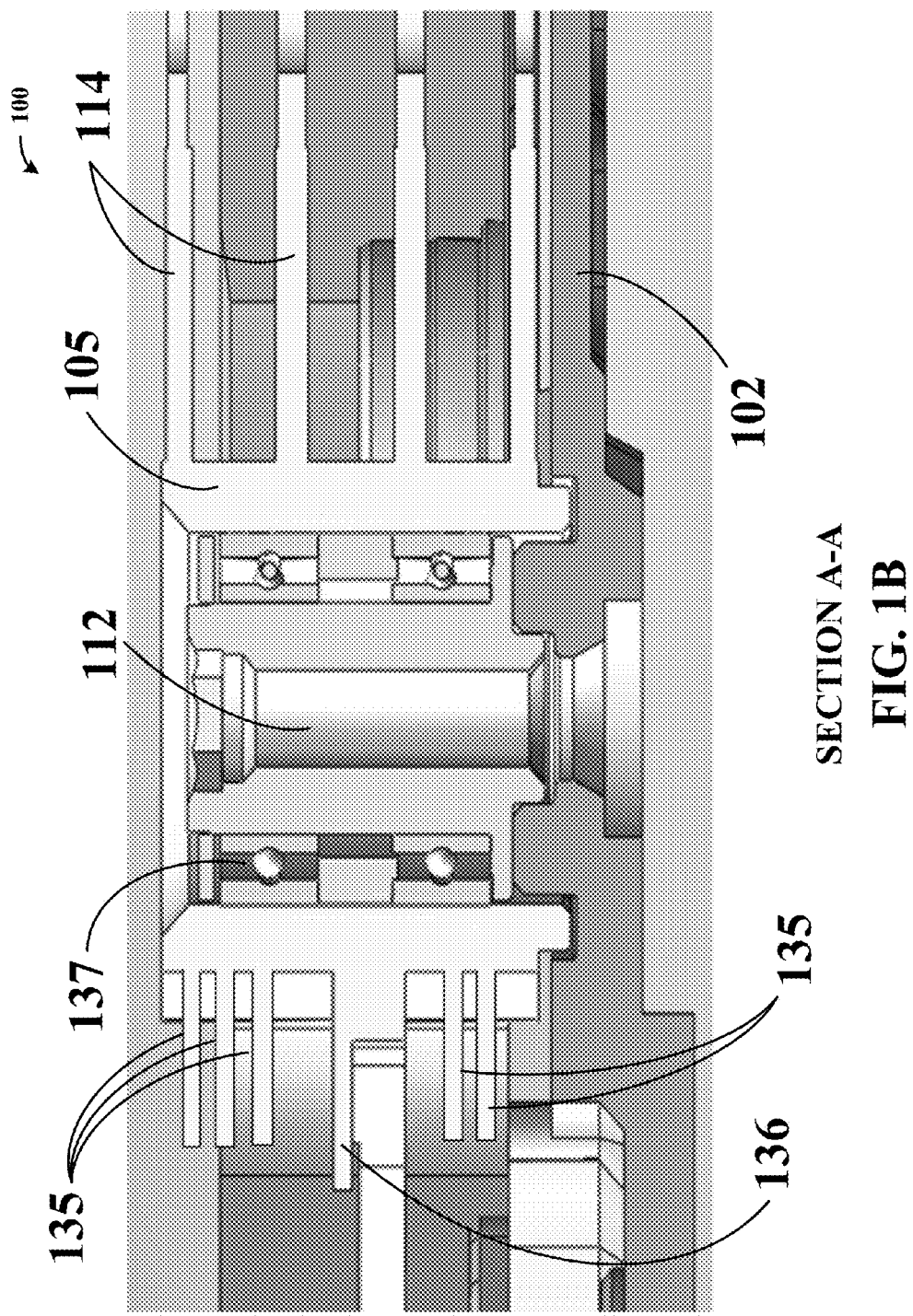
FIG. 1B is a cross-sectional view illustrating a disc drive actuator assembly of FIG. 1A, consistent with various aspects of the present disclosure.

Referring now to FIG. 1B, shown therein is a cross-sectional view of a disc drive 100 including an e-block 105 consistent with an exemplary embodiment of the present disclosure. E-block 105 is rotationally coupled to a pivot shaft 112 of the base deck 102 via bearings 137. The bearings 137 allow the e-block 105 to rotate relative to the pivot shaft 112. This rotation causes the balls within each bearing 137 to rotate which induces friction between the balls and the inner and outer races of the bearing. This frictional energy is dissipated in the form of heat. Over extended periods of use, the heat induced in the bearings 137 may otherwise be sufficient to cause bearing lubricant vaporization and ultimately cause outgassing of the vaporized lubricant into the interior enclosure of the disc drive. Once within a cavity of the disc drive 100, vaporized bearing lubricant may condense onto moving components of the disc drive 100 and cause damage to the moving components which may ultimately lead to failure of the disc drive 100. For example, condensation of such bearing lubricant on the storage medium 108 (as shown in FIG. 1A) can prevent access to data on the storage medium 108 beneath the condensation and/or cause damage to the transducer 118 as it flies in close proximity to the corresponding surface of the associated storage medium 108. Aspects of the present disclosure reduce or limit the operating temperature of the bearings 137 by drawing heat from the bearings 137 through the body of the e-block 105 to heat transfer components 135 coupled to the e-block 105 and located adjacent voice coil mount 136. The heat transfer components 135 convectively dissipate the collected heat energy into the atmosphere of the disc drive 100 enclosure. In these contexts, a sufficient amount of heat conductivity is an amount of heat that prevents all of or nearly all of the bearing grease from vaporizing. The efficiency of the convective transfer of energy into the atmosphere is increased due to the flow of atmosphere in the disc drive 100 enclosure caused by high-speed rotation of the storage medium therein during operation.

Figure 2:
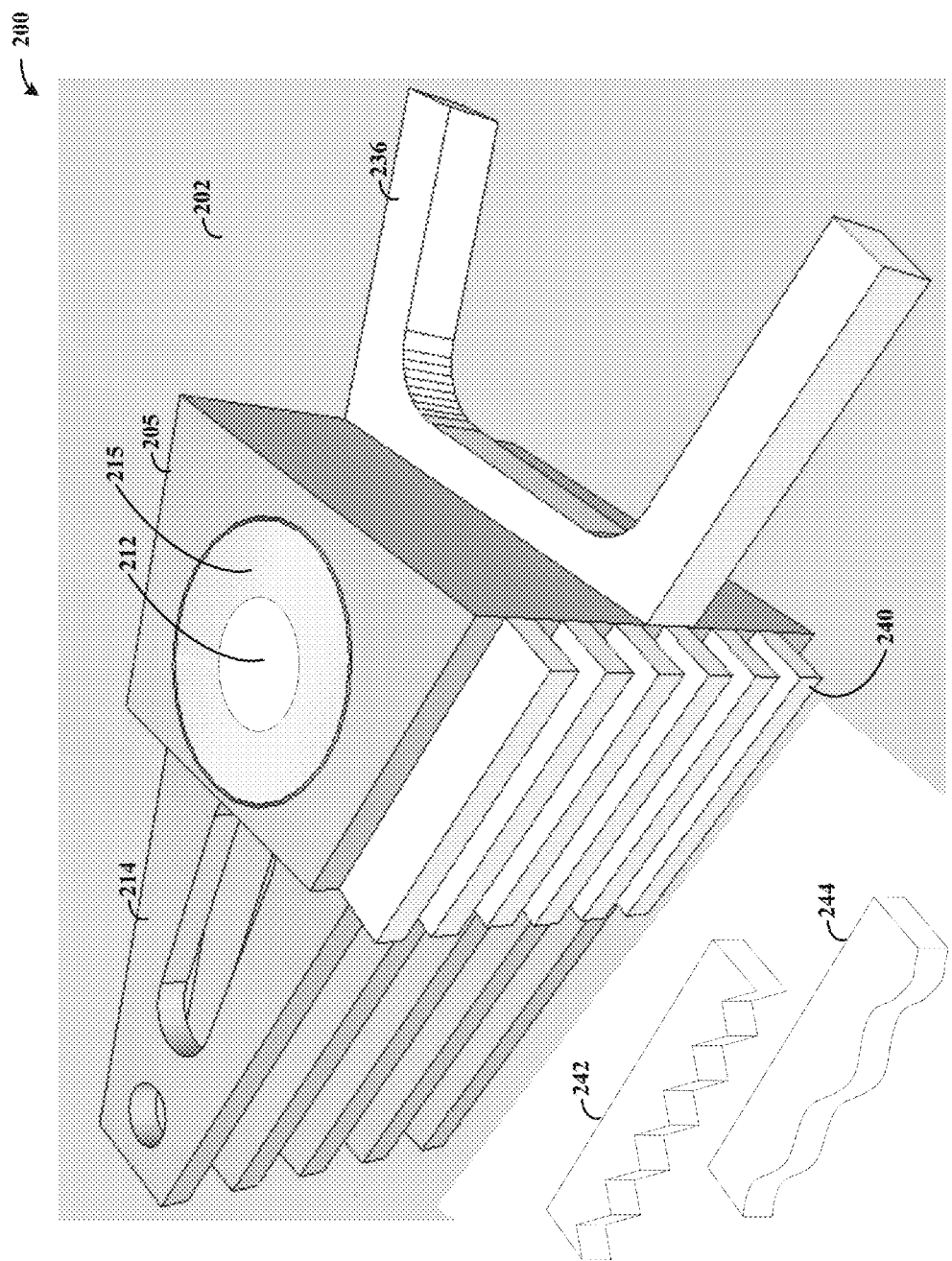
FIG. 2 is an isometric view of a disc drive actuator assembly, consistent with various aspects of the present disclosure.

FIG. 2 is an isometric view of an e-block assembly 200 coupled to a base deck 202 via pivot shaft 212. The e-block 205 includes a voice coil mount 236 for attaching a coil for a voice coil motor and actuator arms 214 for attaching transducers for accessing data on a storage medium. The e-block 205 is rotationally coupled to the pivot shaft 212 via the bearing cartridge assembly 215. As discussed above, during operation of the disc drive, the bearing cartridge assembly 215 warms due to friction, increasing the likelihood that bearing lubricant will vaporize and outgas into the disc drive cavity. The operating temperature of the bearings are limited or reduced by transferring heat from the bearings within the bearing cartridge assembly 215 through the body of the e-block 205 to heat transfer components 240 coupled of the e-block 205 utilizing conductive passive cooling. In the present embodiment, the heat transfer components 240 are located on a surface of the e-block 205 perpendicular to the flow of atmosphere within the disc drive cavity. As the air collides with the surface of the e-block 205, the air flow across the heat transfer components 240 becomes turbulent increasing effective heat transfer from the heat transfer components 240 into the atmosphere.

Figure 3:
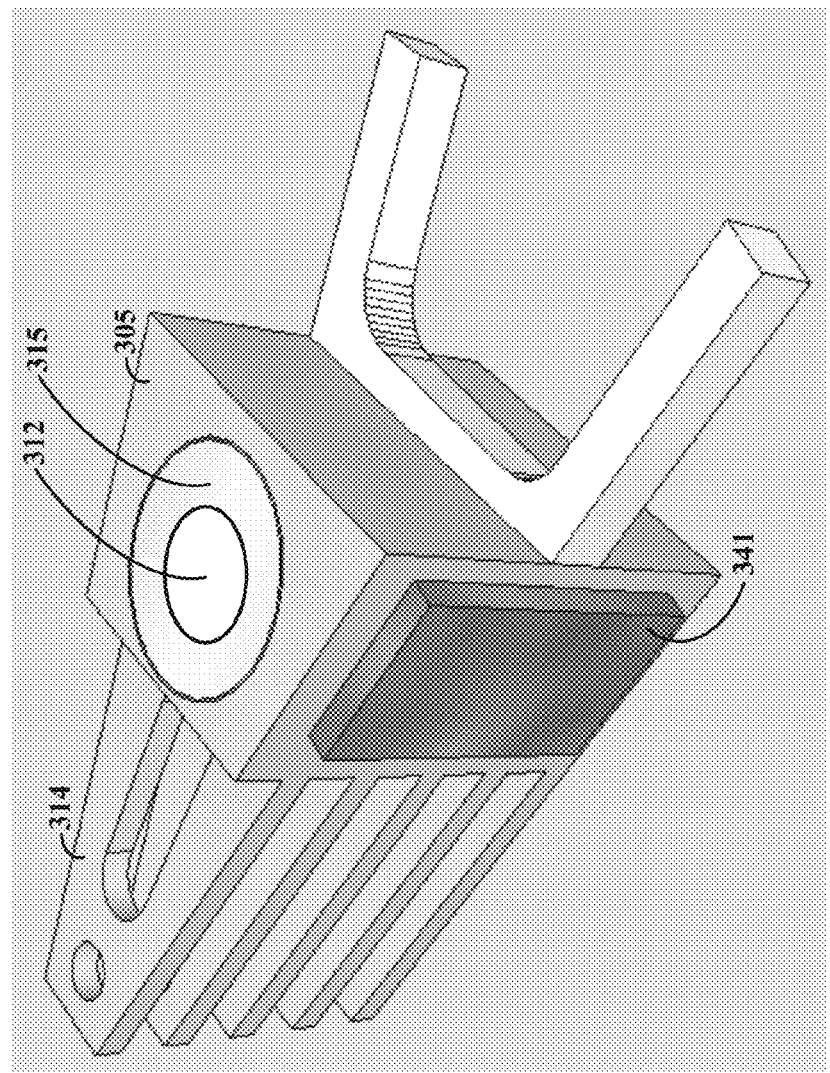
FIG. 3 is an isometric view of a disc drive actuator assembly, consistent with various aspects of the present disclosure.

FIG. 3 is an isometric view of an e-block assembly 300 utilizing a thermoelectric cooler 341 to reduce the operating temperature of bearings within bearing cartridge assembly 315. These bearings facilitate rotation about a shaft when coupled via opening 312, and positioning via actuator arms 314. The thermoelectric cooler 341 uses the Peltier effect to create a heat flux between a junction of two different types of materials. Specifically, heat is transferred from the side of the device adjacent the bearing cartridge assembly 315 to the exterior surface of the thermoelectric cooler 341 in response to the flow of direct current ("DC") electricity across the thermoelectric cooler 341. The thermoelectric cooler 341 may, for example, include n-type and p-type semiconductors are placed thermally in parallel to each other and electrically in series, and joined with a thermally conductive plate on either side of the thermoelectric cooler 341. In such embodiments, when a DC voltage is applied to free ends of the n-type and p-type semiconductors, DC current flows across the junction of the two semiconductors and causes a temperature difference that induces thermal heat transfer from the bearing cartridge assembly 315 to the exterior surface of the thermoelectric cooler 341. The heat is then convectively dissipated into the atmosphere surrounding the e-block 305.

Figure 4B:
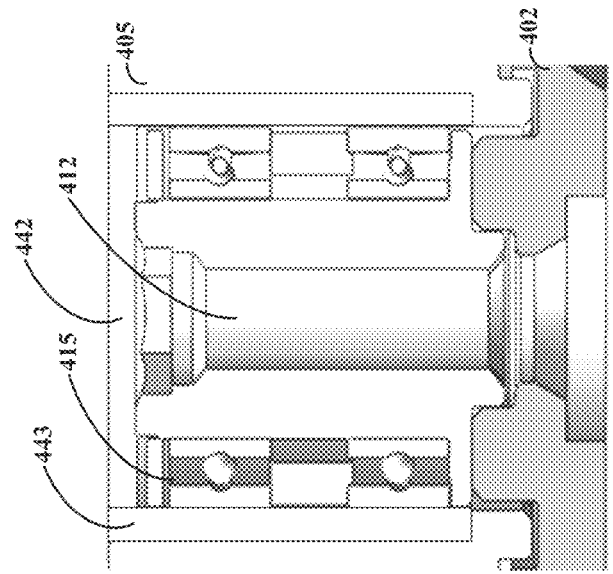
FIG. 4B is a cross-sectional view illustrating the disc drive actuator assembly of FIG. 4A, consistent with various aspects of the present disclosure.
Figure 4A:
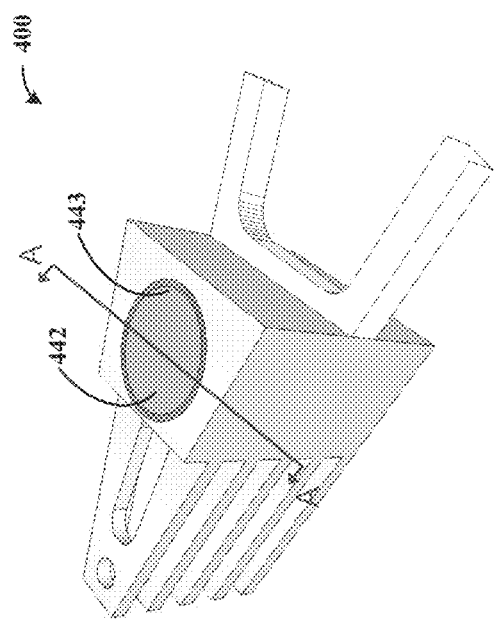
FIG. 4A is an isometric view of a disc drive actuator assembly, consistent with various aspects of the present disclosure.

FIG. 4A is an isometric view of an e-block assembly 400 utilizing both active and passive cooling techniques to reduce the operating temperature of a bearing. The e-block assembly 400 includes a bearing cartridge 443 made of a high thermal conductivity material (e.g., copper, silver, or aluminum). The bearing cartridge 443 is conductively coupled to thermoelectric cooler 442 which actively pulls heat from the bearing cartridge 443 and convectively dissipates the heat into an atmosphere adjacent the e-block assembly 400.

FIG. 4B is a partial cross-sectional view of the e-block assembly 400 of FIG. 4A. As discussed above, during operation of the disc drive, the e-block 405 is rotated relative to the pivot shaft 412 (coupled to the base deck 402) causing the balls in the bearings 415 to rotate and inducing frictional energy which dissipates as heat in the bearings 415. The heat induced in the bearings 415 may otherwise be sufficient to cause bearing lubricant vaporization and result in outgassing of the vaporized lubricant into a cavity of the disc drive. To mitigate such bearing lubricant outgassing, the present embodiment reduces the accumulation of heat in the bearings 415 by conductively transferring heat via a bearing cartridge 443 made of a high thermal conductivity material to a thermoelectric cooler 442 on a top surface of the e-block assembly 400. A flow air or gas across the top surface of the thermoelectric cooler 442 dissipates the heat into the atmosphere of the disc drive, mitigating the potential for bearing lubricant vaporization that can ultimately lead to a failure mode of the disc drive.

Based upon the above discussion and illustrations, those skilled in the art will readily recognize that various modifications and changes may be made to the various embodiments without strictly following the exemplary embodiments and applications illustrated and described herein. For example, the heat transfer components can be any number of passive and/or active cooling elements, and the path of heat flow away from the bearings is not limited to heat transferred through the e-block to the heat transfer components and into a cavity of the disc drive. In some embodiments, the heat may also be dissipated by drawing the heat from the bearings into a pivot shaft of a base deck and convectively transferring the heat into an atmosphere outside of the disc drive, or by conductively transferring the heat to a heat sink/cooling system that serves a number of disc drives in a server-type system. Such modifications do not depart from the true spirit and scope of various aspects of the invention, including aspects set forth in the claims.

What is claimed is:

1. A disc drive actuator assembly comprising:
    an e-block including one or more actuator arms, and a voice coil mount on a first surface;
    a plurality of bearings configured and arranged to facilitate rotation of the e-block around a pivot shaft; and
    one or more heat transfer components including a thermoelectric cooler thermally coupled to a second surface of the e-block that is on a different side of the e-block relative to the first surface, the thermoelectric cooler being configured and arranged to mitigate temperature rise of the plurality of bearings during operation of a disc drive by conductively drawing heat from the plurality of bearings through the e-block, and by convectively dissipating the heat into an atmosphere in contact therewith.

2. The disc drive actuator assembly of claim 1, the e-block including a base portion that includes the first surface and the second surface, and that has a third surface that is on a different side of the base portion relative to the first surface and the second surface, and the one or more actuator arms extending from the third surface.

3. The disc drive actuator assembly of claim 1, wherein the one or more heat transfer components extend from the second surface.

4. The disc drive actuator assembly of claim 1, wherein the one or more heat transfer components include a cylindrical sleeve that encompasses the plurality of bearings, the cylindrical sleeve being configured and arranged to conductively draw heat from the plurality of bearings to the thermoelectric cooler.

5. The disc drive actuator assembly of claim 4, wherein the thermoelectric cooler is coupled to the cylindrical sleeve at the second surface, the second surface being a top surface of the e-block that is perpendicular to a truncated end of the cylindrical sleeve.

6. The disc drive actuator assembly of claim 4, wherein the e-block includes a base portion that includes the first surface and the second surface, and that has a third surface that is on a different side of the base portion relative to the first surface and the second surface;
    the one or more actuator arms extending from the third surface; and
    the thermoelectric cooler extends from the second surface.

7. The disc drive actuator assembly of claim 1, further including a temperature sensor thermally coupled to the plurality of bearings, and a control circuit communicatively coupled to the temperature sensor and the thermoelectric cooler, the control circuit configured and arranged with the temperature sensor to
    operate the thermoelectric cooler in response to receiving a signal from the temperature sensor indicative of a temperature of the plurality of bearings relative to a threshold temperature, and
    disable the thermoelectric cooler in response to receiving a signal from the temperature sensor indicative of the temperature of the plurality of bearings relative to a threshold temperature.

8. The disc drive actuator assembly of claim 1, wherein the one or more heat transfer components include cooling elements selected from the group consisting of: piezoelectric pumps, a heat sink, an integrated heat spreader, and a combination thereof.

9. The disc drive actuator assembly of claim 1, wherein the one or more heat transfer components include a passive heat transfer component configured and arranged to passively conduct heat.

10. The disc drive actuator assembly of claim 1, wherein the one or more heat transfer components are further configured and arranged with the e-block and bearings to mitigate outgassing of bearing lubricant from within the plurality of bearings by limiting increases in temperature of the bearing lubricant during operation of the disc drive, via the heat dissipation.

11. A disc drive actuator assembly comprising:
    an e-block including a base portion having a first surface, a second surface that is different than the first surface, and a third surface that is on a different side of the base portion relative to the first surface and the second surface;
    one or more actuator arms extending from the third surface;
    a plurality of bearings configured and arranged to facilitate rotation of the e-block around a pivot shaft;
    a voice coil mount that extends from the first surface in a first direction relative to the pivot shaft; and
    one or more heat transfer components including a thermoelectric cooler thermally coupled to the second surface and spaced apart from both the one or more actuator arms and the voice coil mount, the one or more heat transfer components being configured and arranged to mitigate temperature rise of the plurality of bearings during operation of a disc drive by conductively drawing heat from the plurality of bearings through the e-block, and by convectively dissipating the heat into an atmosphere in contact therewith.

12. The disc drive actuator assembly of claim 11, wherein the one or more heat transfer components includes a component that extends from the second surface in a second direction relative to the pivot shaft that is different than the first direction.

13. An apparatus comprising:
    a base deck including a pivot shaft fixed relative to the base deck;
    a plurality of storage mediums;
    a disc drive actuator assembly including:
        a transducer configured and arranged to access data storage locations on one of the plurality of storage mediums,
        an e-block including a base portion having a first surface, a second surface that is different than the first surface, and a third surface that is on a different side of the base portion relative to the first surface and the second surface, the e-block being configured and arranged to facilitate read and write access of the plurality of storage mediums by the transducer by positioning the transducer over a portion of the plurality of storage mediums, the e-block having a voice coil mount on the first surface, and
        a plurality of bearings rotationally coupled to the pivot shaft of the base deck and the e-block, the plurality of bearings configured and arranged to facilitate rotation of the e-block around the pivot shaft;
    a heat transfer component including a thermoelectric cooler thermally coupled to the second surface of the e-block that is on a different side of the e-block relative to the first surface, the heat transfer component configured and arranged to conductively draw heat from the plurality of bearings through the e-block to the heat transfer component, and to dissipate the heat into an atmosphere in contact with the heat transfer component; and an actuator arm that supports the transducer and extends from the third surface.

14. The apparatus of claim 13, further including a heat transfer component that extends from the second surface in a second direction relative to the pivot shaft that is different than a direction that the voice coil mount extends from the first surface.

15. The apparatus of claim 13, wherein the heat transfer component and the voice coil mount extend from the e-block in different directions, and the heat transfer component is further configured and arranged to mitigate bearing lubricant outgassing from within the plurality of bearings associated with increased bearing temperature during rotation of the e-block relative the pivot shaft.

16. The apparatus of claim 15, wherein the heat transfer component is configured and arranged with the e-block and bearings to mitigate outgassing of the bearing lubricant by conductively drawing sufficient heat from the bearing to mitigate temperature increases in the bearing lubricant that would cause the bearing lubricant outgassing.

17. The apparatus of claim 13, wherein
the heat transfer component includes passive cooling elements including one or more of the following: a heat sink, and an integrated heat spreader; and
the heat transfer component is located on a surface of the e-block that is perpendicular to a flow of atmosphere within the base deck, the heat transfer component and surface being configured and arranged with the base deck and the storage mediums to cause the flow of atmosphere generated by rotation of the storage mediums to become turbulent.

18. The apparatus of claim 13, wherein the heat transfer component includes a cylindrical sleeve that encompasses the plurality of bearings, the cylindrical sleeve being configured and arranged to conductively draw heat from the plurality of bearings to the thermoelectric cooler, and the thermoelectric cooler is configured and arranged to dissipate the heat into the atmosphere.

19. The apparatus of claim 18, further including a temperature sensor thermally coupled to the plurality of bearings, and a control circuit communicatively coupled to the temperature sensor and the thermoelectric cooler, the control circuit configured and arranged with the temperature sensor to:
enable the thermoelectric cooler in response to receiving a signal from the temperature sensor indicative of a temperature of the plurality of bearings being above a threshold temperature, and
disable the thermoelectric cooler in response to receiving a signal from the temperature sensor indicative of the temperature of the plurality of bearings being below a threshold temperature.

* * * * *